K. M. TIEFENBRUN.
COVERING FOR CONDENSED MILK CANS.
APPLICATION FILED APR. 7, 1919.
1,349,591. Patented Aug. 17, 1920.
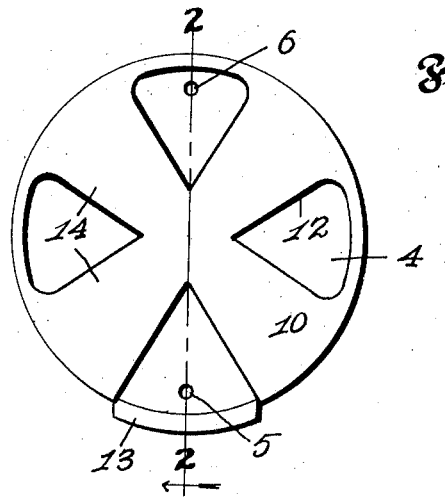
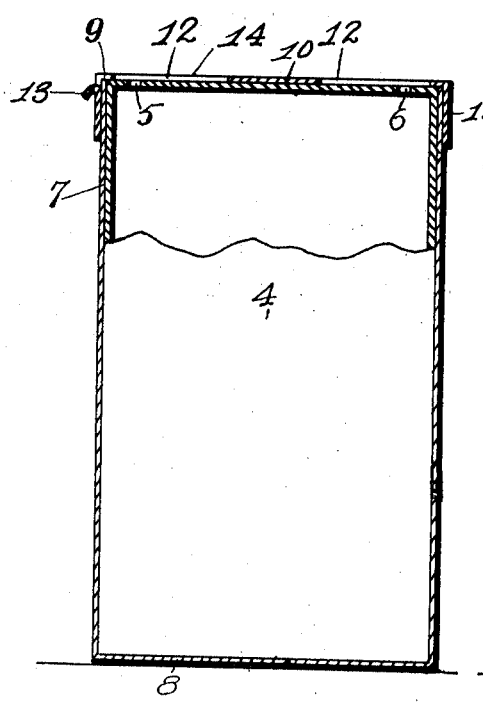
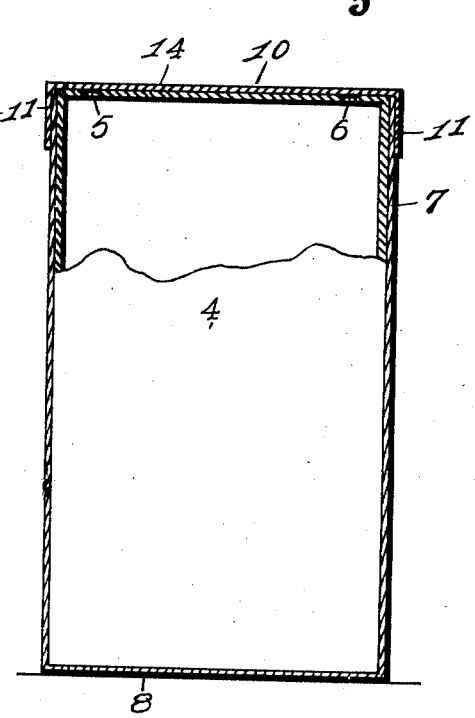
Inventor
Katherine M. Tiefenbrun
By Edward E. Longan
Atty.

UNITED STATES PATENT OFFICE.

KATHERINE M. TIEFENBRUN, OF ST. LOUIS, MISSOURI.

COVERING FOR CONDENSED-MILK CANS.

1,349,591.  Specification of Letters Patent.  Patented Aug. 17, 1920.

Application filed April 7, 1919. Serial No. 288,120.

*To all whom it may concern:*

Be it known that I, KATHERINE M. TIEFENBRUN, a citizen of the United States, and resident of St. Louis and State of Missouri, have invented certain new and useful Improvements in Coverings for Condensed-Milk Cans, of which the following is a specification containing a full, clear, and exact description, reference being had to the accompanying drawings, forming a part hereof.

This invention relates to improvements in covers for condensed milk cans and has for its object a cover in which a condensed milk can may be inserted and which cover is ornamental thereby allowing the use of a milk can on the dining table without the necessity of first pouring the milk into a pitcher, the label on the can being hidden by the use of my device.

A further object is to provide a cover for condensed milk cans which is composed of flexible moisture proof material with a removal and revoluble top, the top being provided with a pouring lip and with strips extending entirely across the top, whereby the perforations in the milk can can be closed, when the top of the covering is rotated.

In the drawings:

Figure 1 is a top view of my device with a milk can located therein, showing the same ready to be poured.

Fig. 2 is a vertical cross section of the cover and milk can taken on the line 2—2 of Fig. 1.

Fig. 3 is a vertical cross section showing the top of the covering revolved into closed position.

In the construction of my device, I make use of the ordinary condensed milk can 4 which is provided with the usual perforations or openings 5 and 6, one of these openings serving as an air inlet and the other to allow the egress of the contents of the can. The can 4 is placed in a holder 7 which is of cylindrical form and is provided with a bottom 8 which will prevent the can from sliding out of the holder. Over the top or opening edge 9 of the holder is placed a cover 10, this cover being provided with a depending flange 11 and the openings 12. A portion of the depending flange 11 adjacent one of the openings 12, is turned downwardly and outwardly, so as to form a lip 13, this lip acting as the lip on a pitcher and directing the flow of the milk which issues from the perforation 5. Between the openings 12 are strips 14 which are joined at their center and, in other words, connect the depending flange 11.

The operation of my device is as follows;

The milk can 4, having been perforated as indicated by the numerals 5 and 6, is inserted in the cover 7 and then the top 10 placed over the cover. This will incase the milk can entirely. When it is desired to pour milk, it is necessary to bring the lip 13 in the position shown in Fig. 1 and then by tilting the cover together with the milk can, the contents can be easily poured. When it is desired to place the can with its covering away for the next meal, the lid 10 is rotated on the cover 7, so that the pair of strips 14 will be over the openings 5 and 6 as illustrated in Fig. 3. This will tend to seal these openings against the entrance of dust or other foreign material.

By making my device out of flexible moisture proof material, the can will be held within the covering by the pressure of the hands in addition to the friction set up between the cover and the lid 10 so that there will be no tendency of the can to slide out of the cover, while the contents are being poured. It is to be understood, of course, that this device may be made of metal and the cover so secured as to be both partially revoluble and also removable from the main body of the cover; but where cheapness of construction is desired, I may make the same out of paper, which has been treated with moisture proofing, or out of celluloid, and ornament the same in any desired manner.

Having fully described my invention, what I claim is:

A covering for a condensed milk can comprising a cylindrical holder closed at one end and formed of flexible non-absorbent material, a lid having radial openings in its face and a depending peripheral flange formed of light material, a pouring lip formed integral with the lid by bending a portion of the top adjacent one of the openings outward and downward.

In testimony whereof, I have signed my name to this specification, in the presence of two subscribing witnesses.

KATHERINE M. TIEFENBRUN.

Witnesses:
 ELIZABETH CARTALL,
 WALTER C. STEIN.